(12) United States Patent
Janssen et al.

(10) Patent No.: US 11,820,047 B2
(45) Date of Patent: Nov. 21, 2023

(54) ADDITIVE MANUFACTURING METHOD AND DEVICE

(71) Applicant: Fraunhofer-Gesellschaft Zur Förderung Der angewandten Forschung E. V., Munich (DE)

(72) Inventors: Henning Janssen, Aachen (DE); Florian Schmidt, Aachen (DE); Christian Brecher, Aachen (DE); Daniel Zontar, Aachen (DE)

(73) Assignee: Fraunhofer-Gesellschaft zur Förderung der angewandten Forschung E.V.

( * ) Notice: Subject to any disclaimer, the term of this patent is extended or adjusted under 35 U.S.C. 154(b) by 0 days.

(21) Appl. No.: 18/011,300

(22) PCT Filed: Jun. 28, 2021

(86) PCT No.: PCT/DE2021/100546
§ 371 (c)(1),
(2) Date: Dec. 19, 2022

(87) PCT Pub. No.: WO2021/259428
PCT Pub. Date: Dec. 30, 2021

(65) Prior Publication Data
US 2023/0211548 A1 Jul. 6, 2023

(30) Foreign Application Priority Data
Jun. 26, 2020 (DE) .................... 10 2020 116 972.8

(51) Int. Cl.
B29C 64/153 (2017.01)
B33Y 10/00 (2015.01)
(Continued)

(52) U.S. Cl.
CPC .......... B29C 64/153 (2017.08); B29C 64/241 (2017.08); B29C 64/273 (2017.08); B33Y 10/00 (2014.12); B33Y 30/00 (2014.12)

(58) Field of Classification Search
CPC ... B29C 64/153; B29C 64/241; B29C 64/273; B33Y 10/00; B33Y 30/00
See application file for complete search history.

(56) References Cited

U.S. PATENT DOCUMENTS

2020/0180224 A1* 6/2020 Budge .................... B33Y 10/00

FOREIGN PATENT DOCUMENTS

DE 4308189 3/1994
DE 102018212019 1/2020
(Continued)

OTHER PUBLICATIONS

European Patent Office, International Preliminary Examination Report and Written Opinion of International Patent Application No. PCT/DE2021/100546, dated Oct. 4, 2022.
(Continued)

Primary Examiner — Nahida Sultana
Assistant Examiner — Jamel M Nelson
(74) Attorney, Agent, or Firm — Williams Mullen; Thomas F. Bergert

(57) ABSTRACT

The invention relates to an additive manufacturing method in which a component (10, 42, 43, 44, 45) is produced in layers using an energy beam (8, 41, 58) which solidifies a starting material (4) and is irradiated by energy beam irradiating means (9, 22, 31, 38, 39, 55, 59, 61) while the starting material (4) is held by a base surface (3, 15, 30, 36, 52) arranged on a base element (2, 16, 29, 35, 51). While the starting material (4) is being irradiated with the energy beam (8, 41, 58), the base element (2, 16, 29, 35, 51) is moved by a rotational component which has a base element rotational (Continued)

Figure 3:
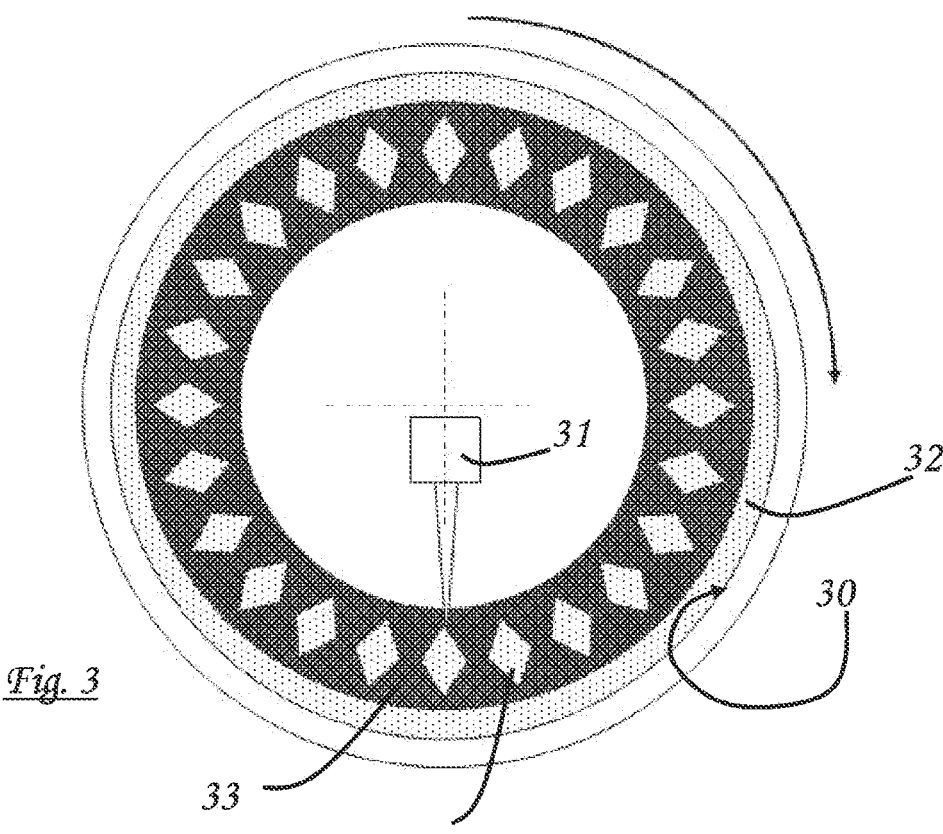

axis, wherein the starting material (4) is held on the base surface (3, 15, 30, 36, 52) by a centrifugal acceleration generated by the rotational component. The invention is characterized in that a rotational movement is produced for at least some of the energy beam irradiating means (9, 22, 31, 38, 39, 55, 59, 61). Analogously, at least one energy beam rotational axis (46) is proposed for rotating at least some of the energy beam irradiating means (9, 22, 31, 38, 39, 55, 59, 61) in an additive manufacturing device in which the starting material (4) is held on a base surface (3, 15, 30, 36, 52) by a centrifugal acceleration.

13 Claims, 3 Drawing Sheets

(51) Int. Cl.
*B33Y 30/00* (2015.01)
*B29C 64/241* (2017.01)
*B29C 64/273* (2017.01)

(56) References Cited

FOREIGN PATENT DOCUMENTS

| EP | 3653319 | 5/2020 |
| JP | 2003251701 | 9/2003 |
| WO | 2018223177 | 12/2018 |
| WO | 2019206546 | 10/2019 |

OTHER PUBLICATIONS

European Patent Office, International Search Report and Written Opinion of International Patent Application No. PCT/DE2021/100546, dated Oct. 21, 2021.

European Patent Office, Written Opinion of International Patent Application No. PCT/DE2021/100546, dated Jun. 2, 2022.

Applicant, Amended claims submitted with letter to International Preliminary Examination Authority in PCT/DE2021/100546, dated Aug. 12, 2022.

German Patent and Trademark Office, Office Action for Application No. DE 10 2020 115 972.8, dated Jan. 20, 2021.

\* cited by examiner

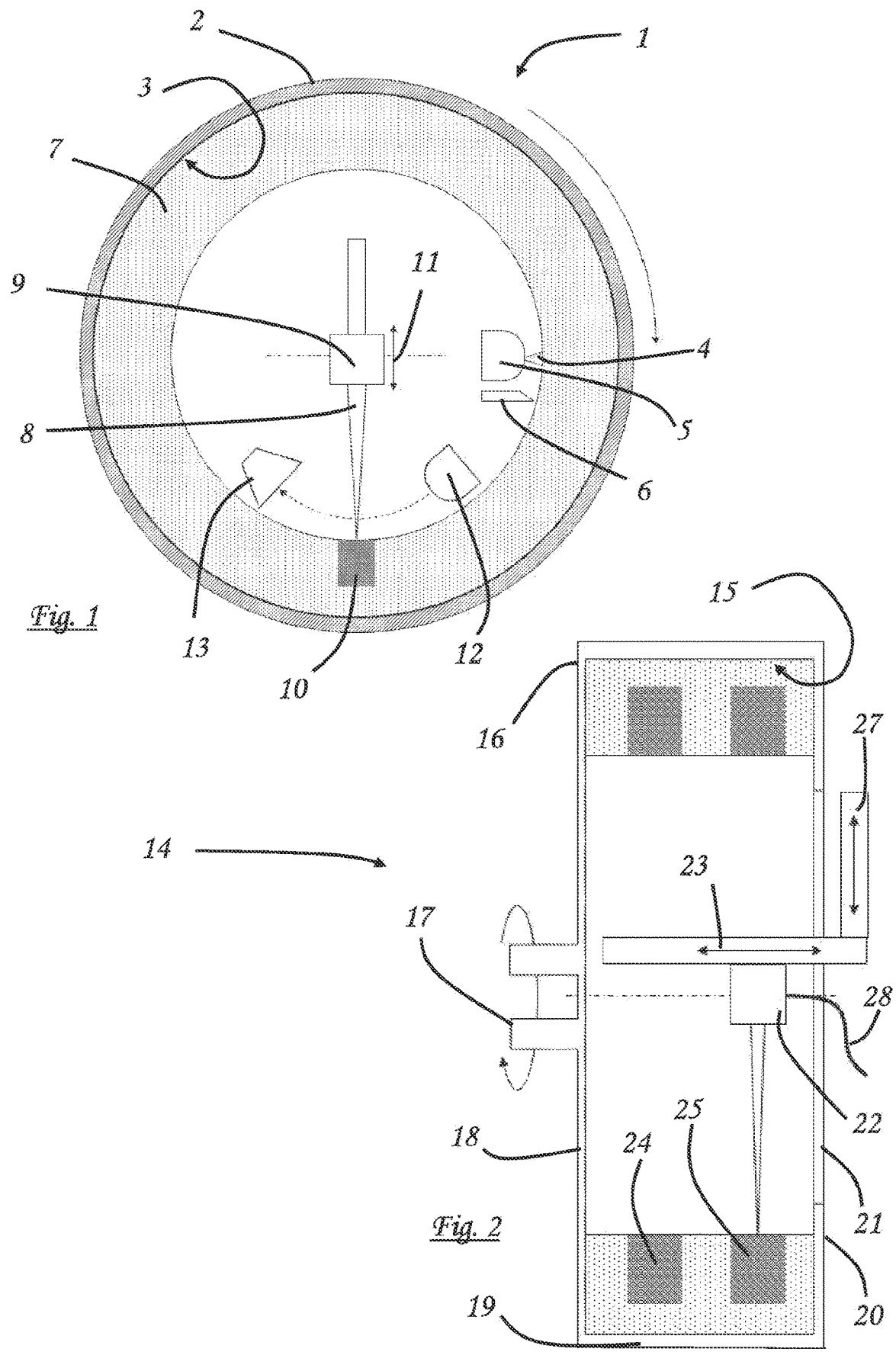

ADDITIVE MANUFACTURING METHOD AND DEVICE

CROSS-REFERENCE TO RELATED APPLICATIONS

This application is the U.S. national phase of International Application PCT/DE2021/100546, filed on Jun. 28, 2021, which claims the benefit of German Patent Application TO 2020 116 972.8 filed on Jun. 26, 2020; all of which are hereby incorporated herein in their entirety by reference.

The invention relates to an additive manufacturing method according to the claims.

Additive manufacturing in the sense of the invention concerned here means the production of components in layers from a starting material, which is present, for example, in powder form, under irradiation by an energy beam, for example a laser beam or an electron beam. For example, Selective Laser Melting, also known as Laser Powder Bed Fusion (LPBF), Selective Laser Sintering (e.g. SLS) or Electron Beam Melting are known from prior art. By building in layers, complex inner and outer structures can be realized in the three-dimensional components, such as e.g. cooling channels or support structures. Additive manufacturing, especially with the use of laser beams, offers a high potential for the realization of digitally controlled process chains in the sense of Industry 4.0. In this way, late customer coupling points can be provided and standardized semi-finished products can be used. Areas of application include in particular the automotive sector, aerospace, medical technology, and toolmaking and mechanical engineering.

Since the development of the LPBF method in 1999, additive manufacturing has become established primarily for the rapid production of prototypes and for small to medium-sized series of specific components. In growing areas, additive manufacturing has since brought a paradigm shift from largely subtractive process chains to generative methods. So far, however, additive manufacturing has found relatively little application in the production of high-volume components, since established methods are generally still more economical in this area.

In many cases, the low cost-effectiveness of additive manufacturing methods is due to the comparatively low build rates to date and the associated high component costs. In addition, additively manufactured surfaces often require post-processing. Additional problems can occur due to residual porosity in the component as well as loss of expensive base material in powder form because of low method efficiency.

Up to now, machine kinematics with a Cartesian coordinate system have prevailed for additive manufacturing, usually with a powder bed that is lowered after completion of a layer of the component, and a 2-axis beam guide for the energy beam.

In some method variants of additive manufacturing, a gas stream is used, in particular consisting of an inert gas that prevents oxidation of the starting material.

EP 3 357 606 A1 describes a device for selective laser melting in which the laser beam is guided with its processing path over the powder bed in such a way that particles produced during processing are not blown onto the unprocessed powder bed by a gas stream directed at the component. In the shown embodiment, the direction of the gas stream is constant, while the direction of the processing path can be changed by a scanner unit of the laser device.

A method and a device of the type mentioned above are known from DE 10 2018 109 737 A1, in which a laser is used for selective sintering of a powder material in a building chamber, the building chamber being annular in structure and rotating relative to a powder deposition system and the laser. The material is applied essentially with a building direction parallel to the rotation axis of the base element. In this way, several components distributed in the ring can be additively manufactured, wherein the same laser scanner can sinter component layers successively on different components, while at the same time new powder can be applied or removed for another component. This is intended to enable a higher throughput.

A similar disclosure results from EP 2 983 896 B1, according to which, in a process chamber of a selective laser melting system, a carrier for a workpiece to be manufactured and a powder distributor for generating a powder bed are provided, wherein the powder distributor and the carrier of the axis are arranged rotatably.

A pot-shaped structure of the carrier is intended to cause the cylindrical wall to rotate together with the bottom when the carrier is rotated, thus avoiding relative movement between the wall of the process chamber in which the powder bed is produced and the rotating bottom of the process chamber, which serves as a base for the workpieces to be manufactured.

A 3D printing method is known from CN 206839165 U, with which cylinders or hollow cylinders with a larger diameter of, for example, more than 2 m can be produced. For this purpose, a 3D printer with an overall cylindrical shape is used, wherein the main building direction is aligned parallel to the cylinder axis.

CN108015278 B discloses a 3D printing device in which powder is distributed in a cylindrical powder distributor with a structure rotating about a z-axis on a bottom perpendicular to the z-axis. The building of components to be printed is carried out parallel to this z-axis.

DE 10 2010 041 284 A1 discloses a method for selective laser sintering, in which the powder is applied by means of a rotating powder distributor, the axis of rotation of which is aligned inside an annularly closed cross-section of the component to be manufactured and perpendicular to the surface of the powder bed. During at least a first linear energy input, which follows the curved contour of the component, the laser beam is to be guided in such a way that the contour is smoothly reproduced by the sintered material.

US 2020/0180224 A 1 discloses a method and device for three-dimensional printing, wherein the device has a frame rotating about an axis and having a base surface on which three-dimensional objects are built in a powder layer as a starting material. The rotational movement of the frame causes a sufficient centrifugal force to act on the powder layer deposited on the base surface so that the powder layer can be continuously held by the base surface and impacted thereon with an energy beam for 3D printing.

The powder can be sprayed on by means of a pivotable arm which is supported on the central rotary shaft for the frame but does not rotate with it. At a radial distance from the rotary shaft of the frame, a beam source is fixed on a gimbal in such a way that it can be pivoted in any direction.

Methods and devices for 3D printing with a rotating base surface and utilization of a centrifugal force acting on the powder are further known from DE 43 08 189 C1 and DE 10 2018 019 A1.

The technical problem to be solved by the invention is to provide an additive manufacturing method and device which have kinematics alternative to the prior art and which offer improved possibilities for influencing the starting material and for process control.

With regard to the method, the technical problem is solved with the characterizing features of claim 1. Advantageous embodiments are apparent from the dependent method claims.

Thus, in an additive manufacturing method in which a component is produced in layers using an energy beam which solidifies a starting material and is irradiated by energy beam irradiation means, while the starting material is held by a base surface arranged on a base element, wherein, while the starting material is being irradiated with the energy beam, the base element is moved by a rotational component which has a base element rotation axis, wherein the starting material is held on the base surface by a centrifugal acceleration generated by the rotational component, it is proposed that a rotational movement is provided for at least one part of the energy beam irradiation means.

Thus, according to the method of the invention, the starting material does not rest on the base surface due to gravitational acceleration, but adheres to the base surface due to centrifugal acceleration. The rotational component of the movement has a suitable angular velocity that prevents the starting material from sliding or falling off the base surface, for example due to gravitational acceleration.

In this way, kinematics are provided for the additive method which offer additional possibilities for influencing the condition of the starting material or various parameters of the manufacturing process. For the first time, it is proposed that rotational movement is provided for at least one part of the energy beam irradiation means. This means that not only the base element but also the energy beam can be rotated during the additive manufacturing method, which opens up additional possibilities in terms of adjusting or changing the relative velocity between the energy beam and the starting material to be processed. The rotational movement for at least one part of the energy beam irradiation means results in the energy beam itself being rotationally guided within the base element, so that the part of the energy beam extending between the energy beam irradiation means and the starting material has an energy beam rotational axis oriented perpendicular to at least one component of the direction of propagation of the energy beam.

The energy beam irradiation means may have optical elements, such as lenses, mirrors, and/or photoconductors.

In particular, it may be advantageous to carry out the method according to the invention in such a way that the rotational movement for the energy beam irradiation means or for at least one part of the energy beam irradiation means is carried out with an energy beam rotational axis parallel to the base element rotational axis. In this way, the energy beam can be used without restriction in the complete angular range of 360° of a central angle of its rotation in the circumferential direction of the base element.

It is particularly advantageous if the base element rotational axis and the energy beam rotational axis are coaxial or can be aligned coaxially to one another. Coaxial alignment of the rotational axes may mean, for example, that in any angular position of the rotating energy beam irradiation means or of the at least one rotating part of the energy beam irradiation means, the radial distance of an exit point for the energy beam from a base surface assumed to be cylindrical remains the same.

The method according to the invention may also be designed such that, during additive manufacturing, a relative velocity of an impact point of the energy beam on the base surface or the surface of the starting material is varied relative to the base surface or relative to the starting material. This results in further parameters for the manufacturing process.

Furthermore, the method according to the invention can be carried out in such a way that the intensity of the energy beam is varied during additive manufacturing.

The variation of the relative velocity as well as of the intensity of the energy beam can be temporal and/or spatial. Thus, different relative velocities and/or intensities can be provided for different coordinates in the axial direction, i.e. parallel to the base element rotational axis, and/or for different layers when building components in layers.

The method according to the invention can be carried out in such a way that the rotational movement of the energy beam irradiation means or of at least one part of the energy beam irradiation means and the rotational movement of the base element are carried out at angular velocities deviating from one another. In this way, the relative velocity of the energy beam to the starting material can be influenced at impact points of the energy beam on the starting material without having to change the rotational speed of the base element. This is advantageous because the base element together with the starting material has the much larger moment of inertia compared to the energy beam irradiation means.

Furthermore, the method according to the invention can be carried out in such a way that the rotational direction of the rotational movement of the energy beam irradiation means or of the at least one part of the energy beam irradiation means and the rotational direction of the rotational movement of the base element are opposite to one another.

In this way, a relative velocity between the energy beam and the starting material is achieved that significantly exceeds the circumferential velocity of the starting material rotating with the base element. Naturally, the rotational direction of the rotational movement of the energy beam irradiation means or of the at least one part of the energy beam irradiation means and the rotational direction of the rotational movement of the base element may be the same. It is also possible to change the rotational direction of the rotational movement of the energy beam irradiation means or the at least one part of the energy beam irradiation means relative to the rotational direction of the rotational movement of the base element, so that a wider range of the relative velocity between the energy beam and the starting material can be utilized.

The method according to the invention can also be carried out in such a way that the angular velocity of the rotational movement of the energy beam irradiation means or of the at least one part of the energy beam irradiation means is changed during additive manufacturing. For example, this angular velocity could be adapted to a changing, for example increasing, layer thickness of the starting material. Thus, as already mentioned, not only can the relative velocity between the impact point of the energy beam and the starting material be changed as required but it is also possible in this way to work towards keeping the relative velocity as constant as possible even as the layer thickness of the starting material increases, without having to change the angular velocity of the base element for this purpose.

The angular velocity of the rotational movement of the base element can be used to influence, for example, pore formation, energy input or, if a gas is used, e.g. a protective gas, the gas stream. It is also possible to provide different orientations of the rotational axis of the rotational component, e.g. parallel or perpendicular to the direction of gravitational acceleration, or any other orientation. During the method, the orientation of the rotational axis can also be changed.

If the starting material is available in powder form, for example, the powder dynamics can be influenced by varying the angular velocity. Increasing rotational velocities lead to higher contact pressures of the powder particles against each other in a powder bed, whereby denudation, i.e. an undesired removal of powder particles or whole layers due to gas streams or other influences, or a spatter ejection of powder particles can be reduced. In addition, the size and/or number of pores or gas pockets in the component can be influenced via centrifugal acceleration. Influencing via centrifugal acceleration is also possible with other forms of starting material, for example with a viscous starting material.

The method according to the invention can be carried out in such a way that the amount of centrifugal acceleration acting on the starting material is at least equal to the amount of gravitational acceleration. In this case, it is also possible to operate the method according to the invention when the base element rotational axis of the rotational component is oriented perpendicular to the gravitational acceleration. The centrifugal acceleration can also be a multiple of the gravitational acceleration, e.g. the acceleration due to the Earth's gravity, e.g. at least 1.5 times, further preferably at least twice the amount of the gravitational acceleration, in absolute numbers related to the acceleration due to the Earth's gravity e.g. at least 15 m/s$^2$, at least 20 m/s$^2$ or also at least 50 m/s$^2$ or at least 100 m/s$^2$. In particular, it may be advantageous to selectively adjust the centrifugal acceleration.

Furthermore, it may be advantageous to vary the centrifugal acceleration during a manufacturing process, for example also in the course of manufacturing the same component. This makes it possible to influence process events in a completely new way during the process. For example, changing the centrifugal acceleration could affect the density of the starting material, which in turn could influence the structure of a component to be manufactured. It could be achieved, for example, that gas pockets migrate in the direction of the rotational axis due to higher pressure in the starting material and the number of pores in the component is reduced.

Furthermore, the method according to the invention can be carried out in such a way that the component is built with layers whose local surface normals have at least one principal component parallel or antiparallel to the centrifugal acceleration. The starting material will usually assume an inner surface whose local surface normal is oriented antiparallel to the centrifugal acceleration. The component layers produced in the bed of the starting material by solidification, for example by welding, sintering or after melting, can also be orientated in a corresponding manner. The sequence of built component layers thus generally extends radially in the direction of the base element rotational axis.

The method according to the invention can also be carried out in such a way that at least two components are built on the same base element in the same manufacturing method. These components may be spaced from one another in the circumferential direction and/or axial direction.

Furthermore, the method according to the invention can also be carried out in such a way that at least one component closed in the circumferential direction of the base surface is built on the base element. For example, such a component may be annular, tubular, or in the shape of a hollow cylinder. Several components closed in the circumferential direction and spaced from one another in the axial direction can be manufactured simultaneously or successively. The component or at least one of the components can be rotationally symmetrical in particular.

Furthermore, the method according to the invention can be carried out in such a way that the base element is in the shape of a hollow cylinder, at least in some areas, and the longitudinal center axis of the hollow cylinder shape is used as the base element rotational axis of the rotational component.

However, the base element can also deviate from the hollow cylinder shape or have structures, for example depressions, chambers or webs, in the base surface, which can help determine the shape of the component to be produced.

The movement of the base element can also deviate from a pure rotation. For example, the rotation can be combined with further movement components, for example a pivoting movement about a pivoting axis perpendicular to the base element rotational axis of the rotational component or with translational movement(s), thus providing further possibilities of influencing the starting material to be solidified.

With respect to an additive manufacturing device comprising a base element having a base surface for receiving a starting material, energy beam irradiation means configured to irradiate an energy beam in the direction of the base surface, and base element drive means for moving the base element with a rotational component having a base element rotational axis, wherein the base surface extends along a direction parallel to the base element rotational axis, the technical problem is solved by at least one energy beam rotational axis for rotating at least one portion of the energy beam irradiation means.

Advantageous further developments are apparent from the dependent device claims.

An extension of the base surface along the direction parallel to the base element rotational axis does not mean that the base surface must have a surface vector parallel to the base element rotational axis, i.e. runs parallel to the base element rotational axis. Viewed in the direction of the base element rotational axis, the base surface can therefore also be inclined, at least in sections. Thus, as will be explained below, the base surface may deviate from a hollow cylindrical shape in particular.

The energy beam irradiation means may have, for example, beam forming means or beam guiding means, such as one or more irradiation guiding fibers, mirrors, or other optical elements, or a scanning device. The energy beam can be a laser beam or any other energy beam suitable for solidifying the starting material, e.g. an electron beam or, especially in the case of liquids as starting material, a beam created with UV radiation.

The base element drive means are configured to rotate the base element at a sufficiently high angular velocity to hold the starting material on the base surface due to the centrifugal acceleration acting thereon. Preferably, the amount of centrifugal acceleration acting on the starting material is at least equal to the amount of gravitational acceleration.

The device according to the invention may also have at least one axis of movement additional to the energy beam rotational axis for moving at least one part of the energy beam irradiation means. The part of the energy beam irradiation means that is movable for rotation or for the additional axis of movement can, for example, be a beam output to which the energy beam is supplied via suitable means, e.g. mirrors, beam guiding fibers and/or other optical elements.

At least one of the additional axes of movement can be a pivoting axis. Thus, it is possible that the energy beam irradiation means or its movable part rotates or pivots with the base element in the same orientation and with the same angular velocity. For layer building, the energy beam can be guided over the starting material by suitable means, such as with a scanner device or with other beam deflection means, which are part of the energy beam irradiation means or are provided separately. However, the rotation or pivoting movement of the energy beam irradiation means or the movable part thereof need not necessarily coincide in angular velocity with the rotation of the base element. It is also conceivable to temporarily suspend the rotation or pivoting of the energy beam irradiation means or the movable part thereof, or to use an angular velocity which deviates from the angular velocity of the base element.

If the energy beam irradiation means or the movable part thereof is not rotating or pivoting or its angular velocity deviates from that of the base element, the irradiation can be coordinated with the rotation of the base element, for example, by activating or releasing the energy beam for irradiation onto the starting material or the component whenever the area of the starting material to be processed or the component already partially manufactured has reached a suitable position. In this case, pulsed irradiation is indicated, i.e. irradiation that is interrupted once or a plurality of times during one rotation of the base element relative to the energy irradiation means. The irradiation time can be calculated, for example, from the rotational velocity of the base element and the current inner diameter of the starting material, for example the powder bed, and the diameter of the impacting energy beam. Furthermore, the times at which the irradiation of the starting material or the component begins and/or ends can be synchronized with the angular position of the base element. In the case of components closed in the circumferential direction of the rotational movement of the base surface, the radiation can also be continuous in the course of at least one revolution of the base element.

The device according to the invention can also be carried out in such a way that at least one of the additional axes of movement is a translational axis, in particular a linear axis, Such a translational axis may also be provided in addition to the at least one rotational axis for the energy beam irradiation means or for the movable part thereof. The at least one translational axis can be provided in particular for a movement parallel and/or perpendicular to the base element rotational axis. The translational axis, which has at least one component parallel to the base element rotational axis, may be designed to allow at least one portion of the energy input means or the movable portion thereof to move into or out of a base element interior.

Rotational axes, pivoting axes, and translational axes may be located in or near the base element rotational axis or may have a radial distance therefrom. Such a distance may be particularly useful if the base element has a large diameter of, for example, more than 1 m.

The device according to the invention may also be designed such that means for applying the starting material and/or means for smoothing, distributing and/or removing the starting material and/or means for supplying a gas and/or means for extracting a gas or waste products are arranged within a base element interior space which is traversed by the base element rotational axis and at least partially surrounded by the base surface or can be arranged therein for the operation of the device.

For example, the energy beam irradiation means or a portion thereof, such as the beam output of the energy beam irradiation means, may be arranged approximately centrally in the given axial extension of the base surface parallel to the base element rotational axis. The same applies to the other aforementioned means arranged in the base element interior. However, these means or the energy beam irradiation means or part thereof can also be arranged at different positions along the axial extension.

However, the aforementioned means, including the energy beam irradiation means or the portion thereof, may also extend in an axial direction such that the base surface may be operated over at least substantially its entire axial extension, e.g., with applying of starting material and/or smoothing, distributing or removing of starting material and/or supplying/extracting of a gas.

The device according to the invention can also be designed such that the means for applying the starting material and/or the means for smoothing, distributing and/or removing the starting material and/or the means for supplying a gas and/or the means for extracting a gas or waste products are axially and/or radially displaceable. Thus, the additive manufacturing method can be influenced in a variety of ways. In particular, it is possible to simultaneously solidify the starting material in at least one location of the base surface and apply starting material in at least one other location of the base surface.

The axial displaceability can be so extensive that the beam output and/or the other aforementioned means can also be guided out of the base element.

The device according to the invention can also be designed such that the means for applying the starting material and/or the means for smoothing, distributing and/or removing the starting material and/or the means for supplying a gas and/or the means for extracting a gas or waste products are supported rotatably or pivotably, in particular with a rotational or pivoting axis parallel to the base element rotational axis.

The means for applying the starting material and/or the means for smoothing, distributing and/or removing the starting material and/or the means for supplying a gas and/or the means for extracting a gas or waste products can rotate or pivot synchronously with the base element or move on a circular or spiral path to follow the processing location, for example on the component. However, it is also conceivable not to rotate or pivot the aforementioned means or to rotate or pivot them at an angular velocity deviating from the angular velocity of the base element and instead to coordinate the irradiation of the energy radiation with the rotation of the base element in such a way that the energy radiation impacts the starting material only in the region of the component layers to be manufactured. In this case, pulsed or intermittent operation of the energy beam irradiation means can be indicated.

During a pivoting movement or a rotation of the means for applying the starting material, the starting material can be fed, for example, via a rotary feedthrough, e.g. via at least one open axial end of the base element. However, it is also conceivable to arrange the necessary supply of starting material or a part thereof inside the base element. If necessary, production can be interrupted to replenish the supply.

The device according to the invention can be manufactured with a wide variety of sizes of the base element.

Inner diameters for the base element in the range of 1 m or 2 m or more are conceivable and thus allow the arrangement of the required elements, such as energy beam irradiation means or the means for applying the starting material and/or the means for smoothing, distributing and/or removing the starting material and/or the means for supplying a gas and/or the means for extracting a gas or waste products, in the base element interior. But of course, diameters of significantly less than 1 m can also be useful, depending on the desired geometry.

The means for applying the starting material and the means for smoothing, distributing and/or removing the starting material can be realized by a uniform device, e.g. an applicator for the starting material and a scraper arranged thereon. The means for distributing the starting material can also be those which act by means of a gas stream, in particular means which have a nozzle, e.g. a slotted nozzle. The gas stream can be used alternatively or additionally for smoothing.

The special design of the device according to the invention also allows the installation space for the base element or the entire device to be changed in the axial direction in a simple manner, irrespective of the diameter of the base element. Thus, in the axial direction, the usable base area can be extended or shortened as required, for example by replacing the base element or using a base element whose axial extension can be varied.

Furthermore, the device according to the invention can also be designed in such a way that, in a sectional plane perpendicular to the base element rotational axis, the base surface concentrically encloses the base element rotational axis, at least on the majority of the circumference. Insofar as the base surface concentrically and completely encloses the base element rotational axis over all sectional planes intersecting the base surface, the base surface forms a rotational body. However, the base surface may also correspond to an incomplete rotational body which does not completely enclose the base element rotational axis in the circumferential direction, but has at least one interruption in the circumferential direction so that radiation or matter can be introduced into the base element interior from the outside or can leave the base element interior, e.g., to remove excess starting material.

The device according to the invention can also be designed in such a way that the base surface has the shape of a cylindrical surface at least in a partial region extending in a direction parallel to the base element rotational axis and at least on the majority of the circumference. For example, the base element can be formed in sections as a hollow cylinder.

Viewed in the direction of its axial extension, the base surface can have at its ends respective end walls extending from the base surface, preferably perpendicularly, in the direction of the base element rotational axis, which end walls hold the starting material in the base element at least during rotation of the base element. At least one end wall can also be movable or removable to facilitate emptying of the base element.

In principle, the base element can be opened at one or both axial ends to such an extent that the energy beam or starting material or further elements, e.g. the energy beam irradiation means or a part thereof and/or the means for applying the starting material and/or the means for smoothing, distributing and/or removing the starting material and/or the means for supplying a gas and/or the means for extracting a gas or waste products, can be supplied therethrough. For this purpose, the base element can be completely free of walls or supports at both ends. If required, the base element can be supported and/or driven from the outside, for example via rollers.

Insofar as the previous description and the claims represent the method according to the invention and the device according to the invention with a component, a base element, a base surface or an energy beam, or other elements in each case in the singular, this is exemplary and not a limitation. Thus, the invention also comprises variants having more than one of these elements, e.g. two or more base elements each having at least one base surface or two or more energy beams may be provided.

Several base surfaces delimited from one another can also be realized in the base element or in at least one of the base elements.

In the following, preferred embodiments of the method according to the invention as well as of the device according to the invention are described with reference to Figures.

The Figures show the following, schematically and in partial representation:

FIG. 1: An axial cross-section of a first embodiment of a selective laser melting system, FIG. 2: a lateral cross-section of a second embodiment of a selective laser melting system, FIG. 3: a third embodiment of a system for selective laser melting with manufacture of a rotationally symmetrical component with internal structures, FIG. 4: a fourth embodiment of a selective laser melting system with two laser optics for parallel processing, and FIG. 5: a fifth embodiment of a selective laser melting system.

The Figures do not show the respective system for selective laser melting in its entirety, but are limited in each case to the components essential to the invention. In particular, the systems are also equipped with drive means, control units and feed devices for laser radiation and starting material.

FIG. 1 shows schematically an axial cross-section of a first embodiment 1 of a system for selective laser melting (hereinafter referred to as first LPBF system 1 for short). The first LPBF system 1 has a base element 2, of which only a base surface 3 in the shape of a hollow cylinder can be seen in the representation of FIG. 1.

The base element 2 is rotated by drive means not shown here. The drive means can, for example, act on the base element 2 from the outside in a form-fit or force-fit manner. As an example, a powder 4 is used here as the starting material for additive manufacturing, which is applied to the base surface 3 using a powder applicator 5. Due to the rotational movement, the direction of which is shown by an arrow, about a base element rotational axis, which is perpendicular to the drawing plane, and the centrifugal acceleration which accompanies it, the powder 4 remains on the base surface 3. A powder bed 7 is created by the application of powder. The powder applicator 5 can be moved in the circumferential direction relative to the base element 3, e.g. by the rotation of the base element 2 alone, or additionally by separate drive means not shown here.

A scraper 6 ensures uniform distribution of the powder 4. An energy beam in the form of a laser beam 8 is irradiated onto the powder bed 7 via laser optics 9. The laser beam 8 selectively melts the powder in the powder bed 7 in one layer, wherein the lateral layer dimensions of the component to be produced are determined by a movement of the laser beam 8 and the layer thicknesses are determined by the height of the respective new powder layer. As the molten layer cools, the material solidifies to form a first layer of a desired component 10, which is built successively in this way. Correct focusing of the laser beam 8 on the powder bed can be achieved by changing the laser optics 9 or by moving the laser optics 9 relative to the base element rotational axis. The displacement of the laser optics 9 can, for example, take place via a first linear axis 11.

The laser optics 9 can also be moved in other directions, for example via a second linear axis, not shown here, parallel to the base element rotational axis. Alternatively, the laser optics can extend over the entire axial length required for manufacturing the component or act on a corresponding distance by means of a scanner unit not shown separately here, so that it is not necessary to displace the laser optics 9 parallel to the base element rotational axis.

Figure 5:
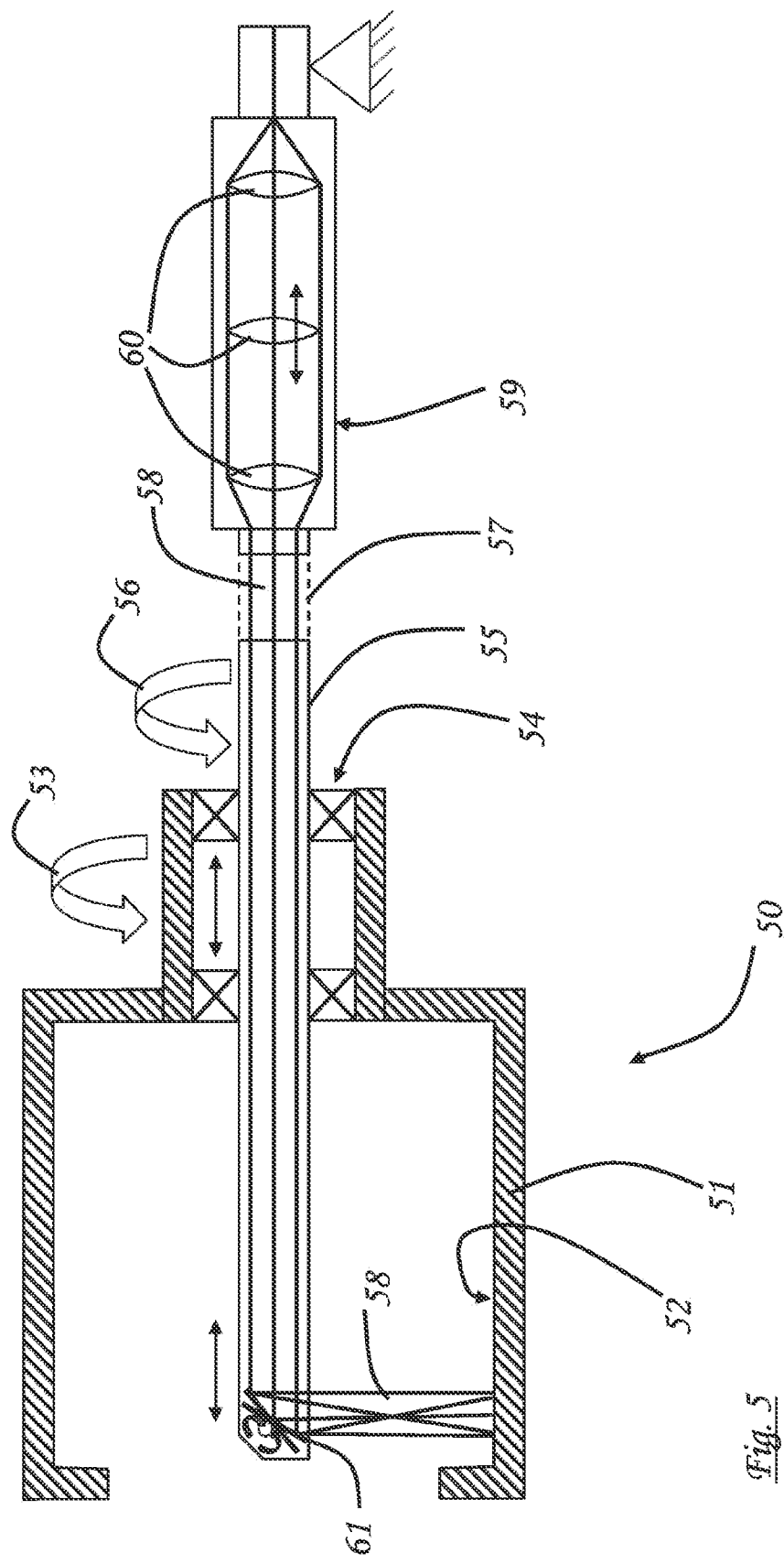

The laser optics are supported in such a way that they can be rotated about an energy beam rotational axis parallel, preferably coaxial, to the base element rotational axis, as explained in more detail in FIG. 5 with reference to a further embodiment example.

An inert gas applicator 12 is used to emit an inert gas in the additive manufacturing area, which is collected by means of a gas collector 13. It is apparent that the application of the powder 4 and the manufacture of the component 10 can take place simultaneously.

The gas stream emitted by the inert gas applicator 12 can also assist or even cause the distribution and smoothing of the powder 4 in the powder bed 7, so that the scraper 6 can be dispensed with.

The inert gas applicator 12, the gas collector 13 and/or the powder applicator 5 can be radially and/or axially movable. The radial movability is helpful for adapting to the growing component. The axial movability can be used to adapt to a processing area that is being displaced in the axial direction. However, the inert gas applicator 12, the gas collector 13, and/or the powder applicator 5 can also extend in the axial direction over the entire processing area.

The laser optics 9, the inert gas applicator 12, the gas collector 13 and/or the powder applicator 5 can rotate, pivot or move on a circular or spiral path synchronously, i.e. with an angular velocity identical to that of the base element 2, in order to follow the processing location, for example on the component 10. In this case, the laser optics 9 can be operated continuously. However, it is also conceivable, for example, to temporarily not rotate the laser optics 9 about its energy beam rotational axis or to rotate it at an angular velocity deviating from the angular velocity of the base element and to coordinate the laser radiation with the rotation of the base element 2 in such a way that the laser radiation impacts on the powder bed 7 only in the region of the layers to be manufactured of the component 10, In this case, pulsed or intermittent operation of the laser is indicated.

FIG. 2 schematically shows a cross-section of a second LPBF system 14 with a base element 16 which has a base surface 15 in the shape of a hollow cylinder, is drum-shaped and has a drive socket 17 for the engagement of a drive element for the base element 16, which drive element is not shown here. In addition to a bottom piece 18 and the circumferential wall 19 for the base surface 15, the base element 16 comprises a front end wall 20 with an opening 21 which allows access for laser optics 22 with a feed line 28 and an axial linear guide 23. Outside the base element 16, a radial linear guide 27 is provided for the laser optics 22. The radial linear guide 27 may alternatively be arranged within the base element 16. The linear guides 23 and 27 are shown only symbolically and are combined in a manner not shown here with the means for supporting and driving a rotation of the laser optics 22, which means are also not shown.

Further elements, such as a powder applicator or an inert gas applicator, are not shown in FIG. 2 for the sake of clarity, but they can also be inserted via the opening 21 and their spatial position can be changeable, for example, via linear guides or via rotation or pivoting axes.

The second LPBF system 14 shown is used, for example, to manufacture two components 24 and 25, which can be closed in the circumferential direction of the base element 16 and each have an annular shape, for example.

FIG. 3 schematically shows a cross-section of a base element 29 with base surface 30 of a third LPBF system 26, wherein the base element 29 rotates in the direction of the arrow. Laser optics 31 are arranged in the base element 29, by means of which an annularly closed component 33 with cavities 34 is produced by additive manufacturing from a powder bed 32, only one of which cavities is provided with a reference number. The energy beam rotational axis (see 46 for the fourth embodiment in FIG. 4) for the laser optics 31 is not shown here.

Figure 4:
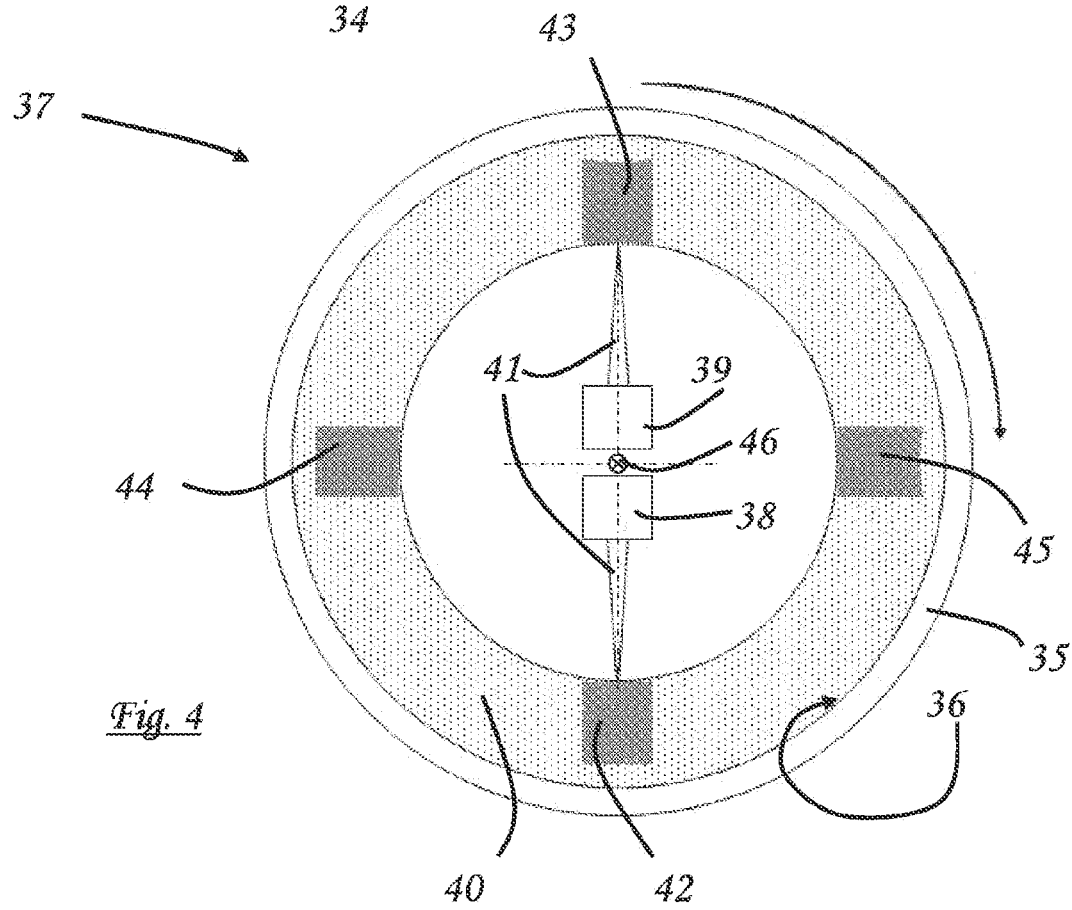

FIG. 4 schematically shows a cross-section of a base element 35 with base surface 36 of a fourth LPBF system 37, wherein the base element 35 rotates about the base element rotational axis in the direction of the arrow.

First laser optics 38 and second laser optics 39 are arranged in the base element 35, which laser optics simultaneously apply laser radiation 41 to different locations of a powder bed 40 for simultaneous layer formation on two different components 42 and 43. The first laser optics 38 and the second laser optics 39 may be rotated about the energy beam rotational axis 46 coaxial to the base element rotational axis, and the angular velocity of the laser optics 38 and 39 may at times be identical to or deviate from that of the base element 35 to change the orientation of the laser beams 41 relative to the base element 35. When the base element 35, with respect to its angular position relative to the laser optics 38 and 39, has rotated further by a suitable angle, the laser optics 38 and 39 can simultaneously apply respectively one layer to two other components 44 and 45. By means of the two laser optics 38 and 39, a component further expanding in the circumferential direction, in particular a component that is closed in the circumferential direction, can also be processed simultaneously at different locations. Means for applying the powder and/or for streaming an inert gas, which are not shown here, can also be provided multiple times—for example, corresponding to the number of laser optics 38, 39.

FIG. 5 shows a fifth LPBF system 50 with a base element 51 having a base surface 52. A powder to be used as starting material for additive manufacturing is not shown. The base element 51 is driven by means to rotate at an angular velocity ω1, symbolized by the arrow 53, which means are not shown here. The drive can, for example, engage the outside of the base element 51 in a form-fit or force-fit manner. Via a support 54, a hollow shaft 55 is guided into the interior of the base element 51. The support allows both rotational movement and axial displacement, indicated by the double arrow, between the base element 51 and the hollow shaft 55. Via drive means not shown here, the hollow shaft 55 is driven to rotate at the angular velocity ω2, symbolized by the arrow 56.

Laser radiation 58 from a laser source not shown here is coupled into the hollow shaft 55 via a rotary coupling 57. The rotary coupling allows the radiation source, which is not shown, to be operated without rotary movement.

An optical component 59, symbolized here only by three optical lenses 60, is connected upstream of the rotary coupling 57 in the beam direction, with which a controlled focus adjustment for the laser beam 58 is possible.

The hollow shaft 55 has a mirror element 61 at its front end, which in the example shown is supported for controllable scanning or pivoting movement. However, a fixed mirror element with a fixed angle of e.g. 90° can also be provided, i.e. without a scanning device. By means of the mirror element, the focus of the laser radiation can thus be moved in a controlled manner, e.g. parallel to the hollow shaft 55, i.e. in the axial direction, or also in other directions on the base surface 52 or a powder surface not shown here. In the case of the scanning or pivoting device, this can be done by changing the angle of inclination of the mirror element 61 accordingly, or in the case of a mirror element with a fixed deflection angle, by axial displacement. Of course, alternative optical deflection devices, such as a prism, can be used instead of a mirror. As the thickness of the powder layer changes, the focus position can be adjusted using the optical component 59.

The angular velocity ω2 56 of the hollow shaft 55 corresponds to the angular velocity at which the laser beam 58 rotates about its energy beam rotational axis, here coinciding with the central longitudinal axis of the hollow shaft 55. The angular velocity ω2 56 of the hollow shaft 55 can coincide with the angular velocity ω1 53 of the base element 51, so that the energy beam 58 on one side and the base surface 52 or, respectively, the surface of a powder layer not shown here on the other side have no relative movement with respect to one another at the point of impact of the laser beam 58, if one disregards a scanning movement controlled by the mirror 61.

It is advantageous to select different angular velocities ω2 56 of the hollow shaft 55 and ω1 53 of the base element 51 so that, disregarding any scanning movement of the laser beam 58, there is a relative velocity between the impacting laser beam 58 and the surface of the powder layer.

This relative velocity determines the speed of the process progress and is e.g. at least 100 mm/s, typically 200 mm/s and up to 2 m/s or also up to max. 5 m/s. The relative movement can be achieved with ω2>ω1 or with ω2<ω1. The relative movement can also be achieved by the hollow shaft 55 and base element 51 having opposite rotational directions.

The relative velocity does not have to be constant during the manufacturing process, but can also be changed. For example, different relative velocities can be provided at different axial positions.

In additive manufacturing, components are manufactured in successive layers. Different relative velocities can be provided for different layers of the component. In addition, local variation of the intensity of the laser beam is possible for different axial positions and different layers.

All of the embodiment examples presented can be suitably varied with respect to the number of elements presented, such as laser optics, components, powder applicators, scrapers, inert gas applicators, and/or gas collectors. Instead of powder, an alternative starting material, such as a viscous starting material, e.g. a liquid, is also conceivable as a starting material in the embodiments shown. In addition, alternative energy radiation, for example electron radiation or ultraviolet radiation (UV radiation), can be used instead of laser radiation.

| Reference symbol list | |
|---|---|
| 1 | First LPBF system |
| 2 | Base element |
| 3 | Base surface |
| 4 | Powder |
| 5 | Powder applicator |
| 6 | Scraper |
| 7 | Powder bed |
| 8 | Laser beam |

| Reference symbol list | |
|---|---|
| 9 | Laser optics |
| 10 | Component |
| 11 | First linear axis |
| 12 | Inert gas applicator |
| 13 | Gas collector |
| 14 | Second LPBF system |
| 15 | Base surface |
| 16 | Base element |
| 17 | Drive socket |
| 18 | Bottom piece |
| 19 | Circumferential wall |
| 20 | Front end wall |
| 21 | Opening |
| 22 | Laser optics |
| 23 | Axial linear guide |
| 24 | Component |
| 25 | Component |
| 26 | Third LPBF system |
| 27 | Radial linear guide |
| 28 | Feed line |
| 29 | Base element |
| 30 | Base surface |
| 31 | Laser optics |
| 32 | Powder bed |
| 33 | Component |
| 34 | Cavity |
| 35 | Base element |
| 36 | Base surface |
| 37 | Fourth LPBF system |
| 38 | First laser optics |
| 39 | Second laser optics |
| 40 | Powder bed |
| 41 | Laser radiation |
| 42 | Component |
| 43 | Component |
| 44 | Component |
| 45 | Component |
| 46 | Energy beam rotational axis |
| 50 | Fifth LBPF system |
| 51 | Base element |
| 52 | Base surface |
| 53 | Arrow |
| 54 | Support |
| 55 | Hollow shaft |
| 56 | Arrow |
| 57 | Rotary coupling |
| 58 | Laser radiation |
| 59 | Optical component |
| 60 | Optical lens |
| 61 | Mirror element |

The invention claimed is:

1. An additive manufacturing method in which a component is manufactured in layers by means of an energy beam, which solidifies a starting material and is irradiated by energy beam irradiation means while the starting material is held by a base surface arranged on a base element, wherein, while the starting material is being irradiated with the energy beam, the base element is moved by a rotational component which has a base element rotational axis, wherein the starting material is held on the base surface by a centrifugal acceleration generated by the rotational component, wherein for at least one part of the energy beam irradiation means a rotational movement with an energy beam rotational axis coaxial to the base element rotational axis is provided, wherein the base element rotational movement and the energy beam irradiation means rotational movement are each driven separately and the energy beam irradiation means are moved along a translational axis parallel to the base element rotational axis.

2. The method according to claim 1, characterized in that, during additive manufacturing, a relative velocity of an impact point of the energy beam on the base surface or the surface of the starting material is varied relative to the base surface or relative to the starting material.

3. The method according to claim 1, characterized in that the intensity of the energy beam is varied during additive manufacturing.

4. The method according to claim 1, characterized in that the rotational movement of the energy beam irradiation means or of the at least one part of the energy beam irradiation means and the rotational movement of the base element are carried out at angular velocities deviating from one another.

5. The method according to claim 1, characterized in that the rotational direction of the rotational movement of the energy beam irradiation means or of the at least one part of the energy beam irradiation means and the rotational direction of the rotational movement of the base element are opposite to one another.

6. The method according to claim 1, characterized in that the angular velocity of the rotational movement of the energy beam irradiation means or of the at least one part of the energy beam irradiation means is changed during additive manufacturing.

7. The method according to claim 1, characterized in that the amount of centrifugal acceleration acting on the starting material is at least equal to the amount of gravitational acceleration, preferably at least 1.5 times, further preferably at least twice the amount of gravitational acceleration.

8. The method according to claim 1, characterized in that the amount of centrifugal acceleration is changed in the course of the manufacturing method.

9. The method according to claim 1, characterized in that the component is built in layers, wherein the local surface normals of the layers have at least one principal component parallel or antiparallel to the centrifugal acceleration.

10. The method according to claim 1, characterized in that at least two components are built on the same base element in the same manufacturing method.

11. The method according to claim 1, characterized in that at least one component closed in the circumferential direction of the base surface is built on the base element.

12. The method according to claim 1, characterized in that the base element is in the shape of a hollow cylinder, at least in some areas, and the longitudinal center axis of the hollow cylinder shape is used as the base element rotational axis of the rotational component.

13. The method according to claim 1, characterized in that for the movement of the base element the rotational component is combined with further movement components.

* * * * *